United States Patent
Jiang et al.

(10) Patent No.: US 10,873,391 B2
(45) Date of Patent: Dec. 22, 2020

(54) MFAS-ALIGNED PSEUDORANDOM BINARY SEQUENCE (PRBS) PATTERNS FOR OPTICAL TRANSPORT NETWORK (OTN) TESTING

(71) Applicant: VIAVI SOLUTIONS INC., San Jose, CA (US)

(72) Inventors: Xiaoli Jiang, Germantown, MD (US); Guylain Barlow, Germantown, MD (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 15/974,150

(22) Filed: May 8, 2018

(65) Prior Publication Data

US 2019/0305843 A1    Oct. 3, 2019

Related U.S. Application Data

(60) Provisional application No. 62/648,697, filed on Mar. 27, 2018.

(51) Int. Cl.
*H04B 10/077* (2013.01)
*H04B 10/075* (2013.01)
*H04J 3/16* (2006.01)

(52) U.S. Cl.
CPC ....... *H04B 10/0775* (2013.01); *H04B 10/075* (2013.01); *H04J 3/1652* (2013.01)

(58) Field of Classification Search
None
See application file for complete search history.

(56) References Cited

U.S. PATENT DOCUMENTS

| | | | |
|---|---|---|---|
| 9,882,634 B1* | 1/2018 | Al Sayeed | H04B 10/035 |
| 2004/0126111 A1* | 7/2004 | Cho | H04B 10/00 398/33 |
| 2005/0058080 A1* | 3/2005 | Fiddes | H04L 43/0847 370/242 |
| 2005/0071399 A1* | 3/2005 | Bonaccio | G01R 31/31703 708/250 |

(Continued)

OTHER PUBLICATIONS

Wikipedia, Pseudorandom number generator, Dec. 2017 (Year: 2017).*

(Continued)

*Primary Examiner* — Jai M Lee
(74) *Attorney, Agent, or Firm* — Mannava & Kang, P.C.

(57) ABSTRACT

A test device for Optical Transport Network (OTN) testing using MFAS-aligned pseudorandom binary sequence (PRBS) patterns is disclosed. The test device may comprise a signal generator to generate a test signal that comprises an MFAS-aligned PRBS pattern. The test device may also comprise a transmitter to transmit the test signal into an OTN and a receiver to receive the test signal from the OTN. The test device may comprise a processor to determine whether the received test signal matches the transmitted test signal based on the MFAS-aligned PRBS pattern. The test device employing a technique that uses an MFAS-aligned PRBS pattern may help ensure quality of service in OTN, especially for transmission of secured data.

15 Claims, 8 Drawing Sheets

(56) References Cited

U.S. PATENT DOCUMENTS

| | | | |
|---|---|---|---|
| 2005/0154953 A1* | 7/2005 | Norskog | G06F 11/263 714/738 |
| 2006/0143549 A1* | 6/2006 | Yasumoto | H04L 1/244 714/704 |
| 2006/0253748 A1* | 11/2006 | Brink | H04L 1/244 714/715 |
| 2007/0076769 A1* | 4/2007 | Zou | H04J 3/1658 370/539 |
| 2008/0240077 A1* | 10/2008 | Freiberger | H04L 45/00 370/351 |
| 2010/0040370 A1* | 2/2010 | Aoki | H04J 3/1652 398/58 |
| 2010/0093233 A1* | 4/2010 | Friesen | H01R 4/185 439/879 |
| 2010/0095167 A1* | 4/2010 | Kotrla | H04L 43/0847 714/705 |
| 2010/0142525 A1* | 6/2010 | Cho | H04J 3/1652 370/389 |
| 2010/0142947 A1* | 6/2010 | Shin | H04J 3/1652 398/43 |
| 2010/0208786 A1* | 8/2010 | Miyazaki | H04L 1/20 375/228 |
| 2011/0135312 A1* | 6/2011 | El-Ahmadi | H04L 1/0057 398/135 |
| 2011/0150468 A1* | 6/2011 | Uchida | H04J 3/14 398/45 |
| 2012/0288277 A1* | 11/2012 | Shin | H04J 3/14 398/45 |
| 2013/0251012 A1* | 9/2013 | Fujimori | H04L 1/0001 375/224 |
| 2016/0182275 A1* | 6/2016 | Viswanadham | H04B 10/0771 398/1 |
| 2016/0301669 A1* | 10/2016 | Muma | H04L 63/0428 |
| 2019/0140759 A1* | 5/2019 | Su | H04J 3/14 |

OTHER PUBLICATIONS

Smith, Darrell, The OTU (Optical Transport Unit) Frame, Dec. 2016 (Year: 2016).*

Moreira et al., An Engineer's Guide to Automated Testing of High-Speed Interfaces, 2016, Artech House, p. 556 (Year: 2016).*

Oxford Dictionaries, Synchronize, https://www.lexico.com/en/definition/synchronize#synchronize, 2019 (Year: 2019).*

* cited by examiner

MFAS-ALIGNED PSEUDORANDOM BINARY SEQUENCE (PRBS) PATTERNS FOR OPTICAL TRANSPORT NETWORK (OTN) TESTING

PRIORITY

This patent application claims priority to U.S. Provisional Patent Application 62/648,697, entitled "MFAS-Aligned PRBS Patterns for OTN Testing," filed on Mar. 27, 2018.

BACKGROUND

It has become increasingly popular for network operators to adopt Optical Transport Network (OTN) technology as the technology for construction of optical networks, especially for its error correction and mapping capabilities. OTN may also offer more levels of tandem connection monitoring (TCM), transparent transport of client signals, and/or switching scalability.

When Optical Transport Network (OTN) testing is performed, an optical channel transport unit (OTU) may be used. Specifically, a pseudorandom binary sequence (PRBS) may be inserted into an OTNk frame structure to test the OTN. For example, an OTN may be deemed to be functioning properly if the PRBS pattern that is transmitted through the OTN returns in the same way or in the same sequence. However, if the received PRBS pattern is altered or out of sequence relative to what was transmitted, this may reveal that something in the OTN is causing a change. In situations where an encryption key is used to secure data transmissions in an OTU, preserving ordered sequence of data may be important. As a result, a PRBS-based testing technique that ensures quality of service in OTN, especially for transmission of secured data may be needed.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Optical Transport Hierarchy (OTH) is a transport technology for Optical Transport Network (OTN), which is based on network architecture defined in at least ITU G.872 and G.709, which are hereby incorporated by reference in their entireties. As discussed above, an OTN may offer several advantages relative to synchronous optical networks/synchronous digital hierarchy (SONET/SDH). These benefits may include stronger forward error correction, more levels of tandem connection monitoring (TCM), transparent transport of client signals, switching scalability, and other advantages.

Figure 1:
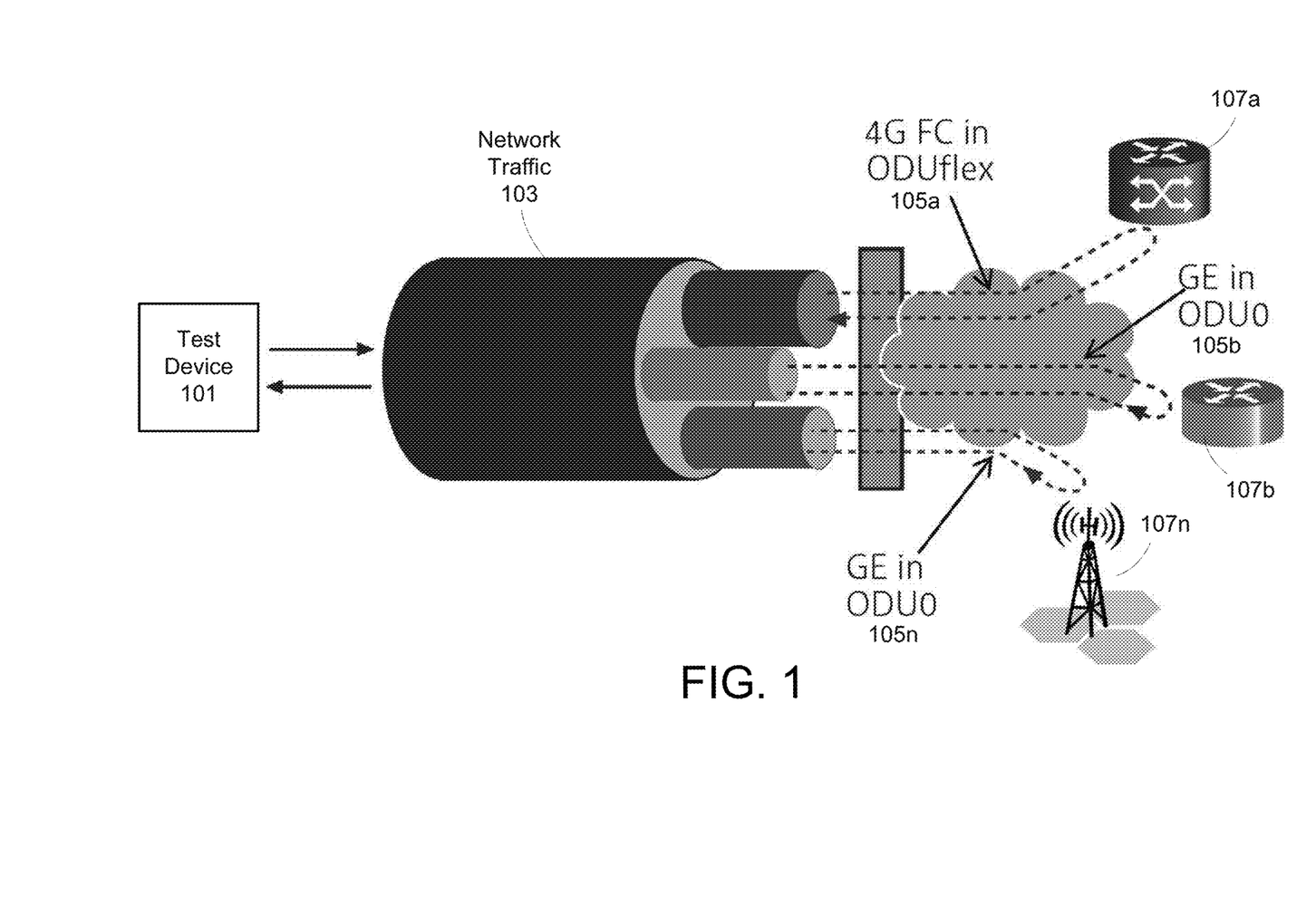
FIG. 1 illustrates a test device for Optical Transport Network (OTN) testing using PRBS patterns aligned to Multi-Frame Alignment Signal (MFAS) carried in OTN frames, according to an example.

FIG. 1 illustrates a test device 101 for Optical Transport Network (OTN) testing using PRBS patterns aligned to Multi-Frame Alignment Signal (MFAS) carried in OTN frames, according to an example. As shown, network traffic 103 may be high-speed OTN signals that in turn may include smaller bandwidth signal channels 105a, 105b, . . . , 105n. These smaller bandwidth signal channels 105a, 105b, . . . , 105n may be associated with various network elements 107a, 107b, . . . , 107n in the OTN. The test device 101 may be able to test the OTN by generating, transmitting, and receiving high-speed OTN signals. In some examples, this may be achieved using multiple channels in parallel. For example, the test device 101 may measure bit error rate (BER), service disruption time (SDT), and various stress-test device under tests (DUTs) to verify performance under severe conditions. This may increase testing efficiencies and minimize expense. Other various tests may also be performed.

In some examples, PRBS-based testing may also be provided. PRBS is a pseudorandom binary sequence, which may be useful in Optical Transport Network (OTN) testing. One or more of these defined test patterns may be standardized, such as that proposed by at least IEEE 802.3bs, and may be useful for measuring key performance parameters. In addition to the advantages described above, these key performance parameters may include optical performance parameters, receiver sensitivity and jitter, or other OTN features. Moreover, performance analysis and troubleshooting may be greatly improved by being able to stimulate, detect, and analyze signals at the test device using PRBS.

An Optical Transport Network (OTN) may be deemed to be functioning properly if the PRBS pattern that is transmitted through the OTN returns in the same way or in the same sequence. However, if the received PRBS pattern is altered or out of sequence relative to what was transmitted, this may reveal that something in the OTN is causing a change. For instance, buffering or other effect at a network element in the OTN may cause the PRBS pattern to be received in a different pattern than the pattern in which it was originally transmitted. In situations where an encryption key is used to secure data transmissions in an Optical Transport Unit (OTU), preserving ordered sequence of data may be even more important.

Figure 2:
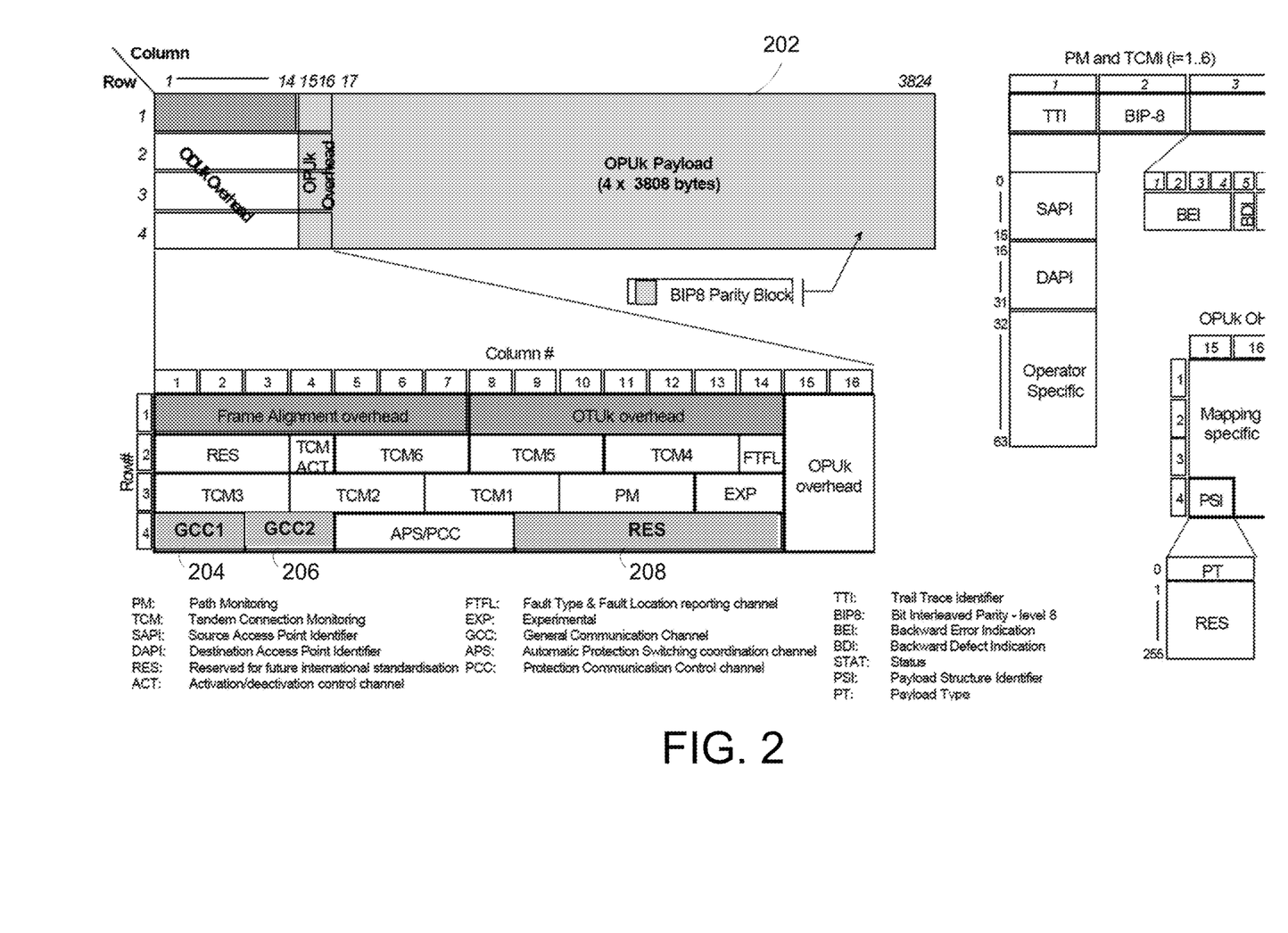
FIG. 2 illustrates an Optical Transport Network (OTN) frame format with OPUk Payload, GCC1, GCC2, and RES, according to an example.
Figure 3:
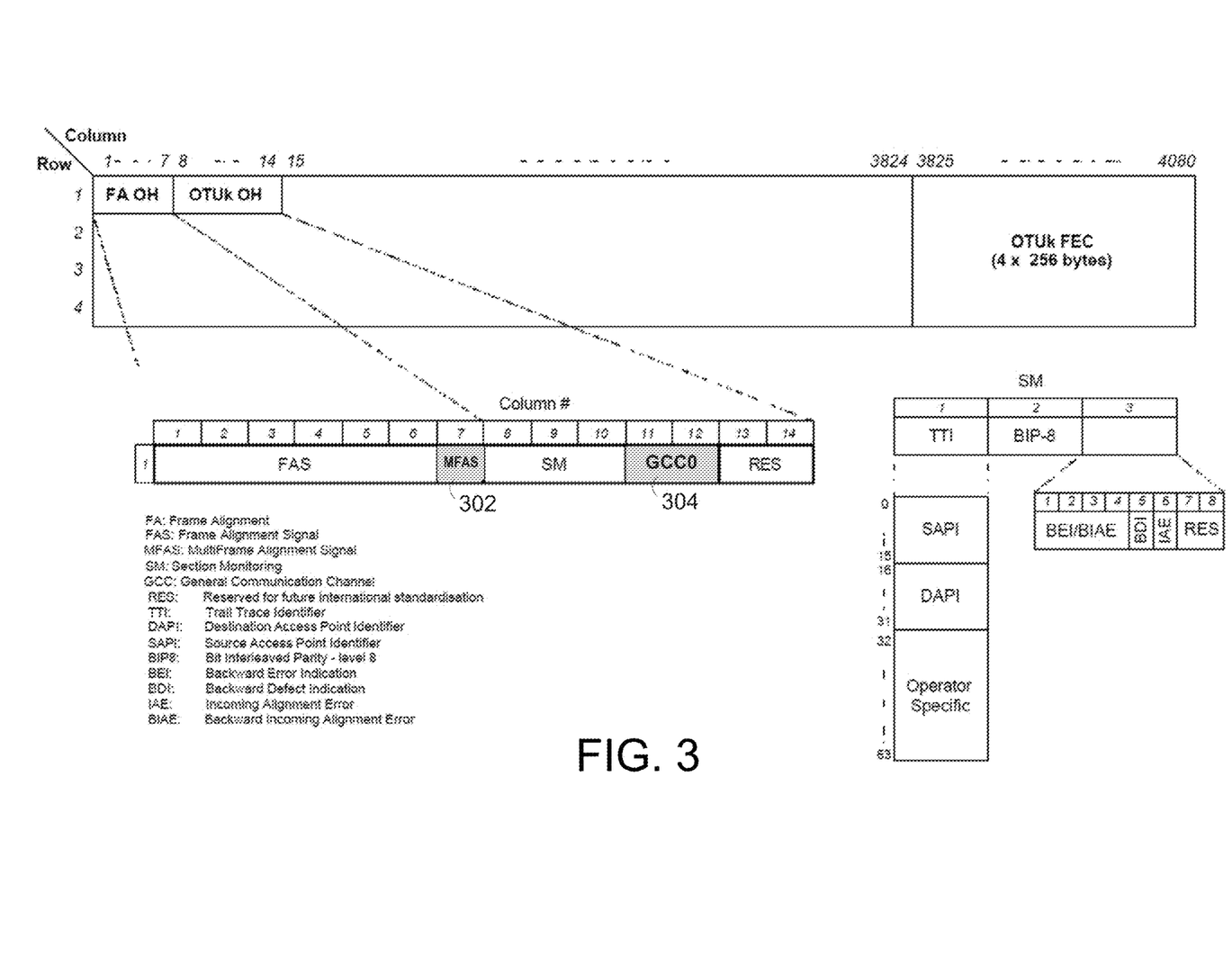
FIG. 3 illustrates an OTUk overhead with MFAS reference, according to an example.

FIG. 2 illustrates an Optical Transport Network (OTN) frame format with an Optical Channel Payload Unit-k (OPUk) Payload, General Communication Channel 1 (GCC1), General Communication Channel 2 (GCC2), and Reserved for Future International Standardization (RES), according to an example. Data may be transmitted in various frames or sections of the OTN frame format. In some examples, this may be achieved using the payload area, GCC1, GCC2, RES and/or GCC0 (as shown in FIG. 3), or other various frames or sections. In some examples, PRBS may be used for data substitution in OTN tests.

Because the Optical Transport Unit (OTU) frames and Optical Channel Data Unit (ODU) frames could span multiple OTU frames (e.g., comprising a 256 frame multiframe), a multi-framed, structured overhead signal is defined in OTN. FIG. 3 illustrates an Optical Channel Payload Unit-k (OPUk) overhead with an MFAS reference, according to an example. An MFAS is a Multi-Frame Alignment Signal which may be used as a reference in the Optical Channel Transport Unit-k (OTUk) overhead when OTUk and ODUk overhead signals span multiple OTUk/ODUk frames. MFAS is defined in row 1, column 7 of the OTU/ODU overhead. The value of the MFAS byte=0 at the beginning of each multi-frame and increments with each OTU/ODU frame in a multi-frame structure. Each new multi-frame, MFAS is reset back to 0, indicating a beginning of a new multi-frame.

In other words, MFAS is one byte per OTUk/ODUk frame that increments from one frame to the next. Its value spans from 0 to 255 to indicate the relative location of each OTUk/ODUk frame within the multi-frame structure. MFAS is an integral part of the OTUk/ODUk frame. For instance, it may be in the OTUk/ODUk frame, incrementing from 0 to 255, and in repeating fashion. Any skipping/repeating of the value in MFAS from one frame to the next may cause MFAS error, and may eventually lead to loss of multiframe synchronization and realignment of the multiframe. When using MFAS-aligned PRBS pattern to test one or more specific overhead bytes, it should be appreciated that both integrity of the values and alignment to the MFAS byte are being tested. It should be appreciated that in situations where an encryption key or other secured data is used, testing using an MFAS-aligned PRBS pattern may be important in OTN testing.

An encryption key, for example, may occupy one or several bytes of space in the OTN overhead to help ensure additional, non-secure, information may not be passed into those locations. However, when providing Optical Transport Network (OTN) tests with unaligned or continuous PRBS patterns, such tests may provide false positives and incorrectly "pass" the test. One key reason for this may be due to delays or slips that occur via transmission and manipulation though intermediate nodes. Because such encryption keys may be aligned with the MFAS, any delays may be detected and OTN testing using MFAS-aligned PRBS patterns may then be critical to successful test execution.

To do this, when MFAS=0, the PRBS (on a transmit side) may be reset to a "seed value." It should be appreciated that the basis for this is that PRBS may be deterministic, having an 8-bit signal in 0-255. In other words, for PRBS, each bit value may be generated based on previous value (m+1), also known as "taps." So by resetting the PRBS to a "seed value," it may refer to the first of 32 bits depending on how large bus may be configured to be. As long as the "seed value" is non-zero, any numerical value can work to generate the PRBS pattern. That said, a receiver and transmitter at the test device may need to know what that seed value is in order to properly perform the Optical Transport Network (OTN) test (e.g., mathematically determine and compare original seed value given that PRBS $2^{23}$). An OTN test using an MFAS-aligned PRBS pattern, rather than continuously running PRBS pattern, may eliminate false positives, detect delays or slips through intermediate nodes, and provide adequate testing techniques for data transmissions using an encryption key or other secured data.

Figure 4A:
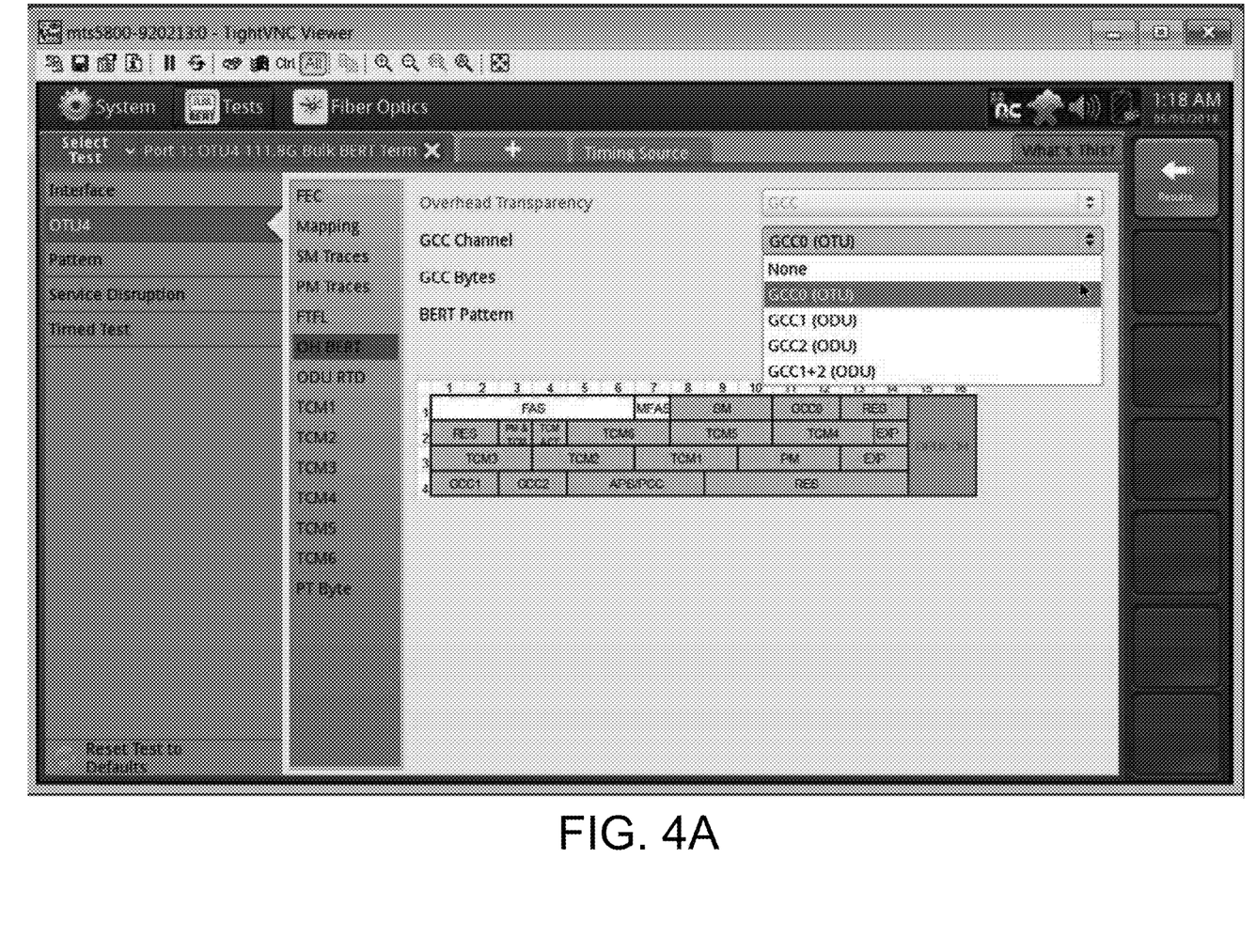
FIGS. 4A-4D illustrate various screens of MFAS-aligned PRBS patterns for Optical Transport Network (OTN) testing, according to another example.
Figure 4B:
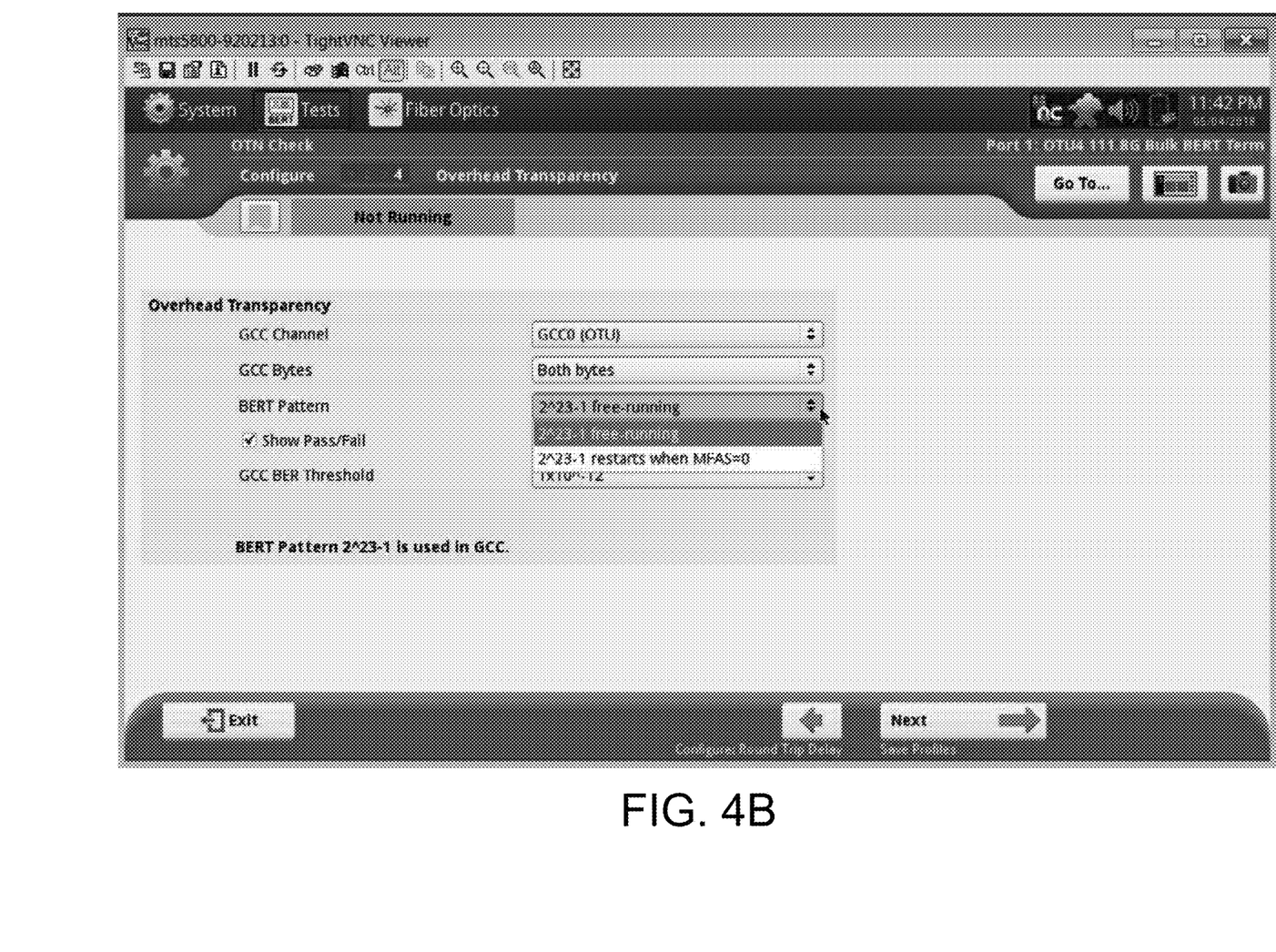
Figure 4C:
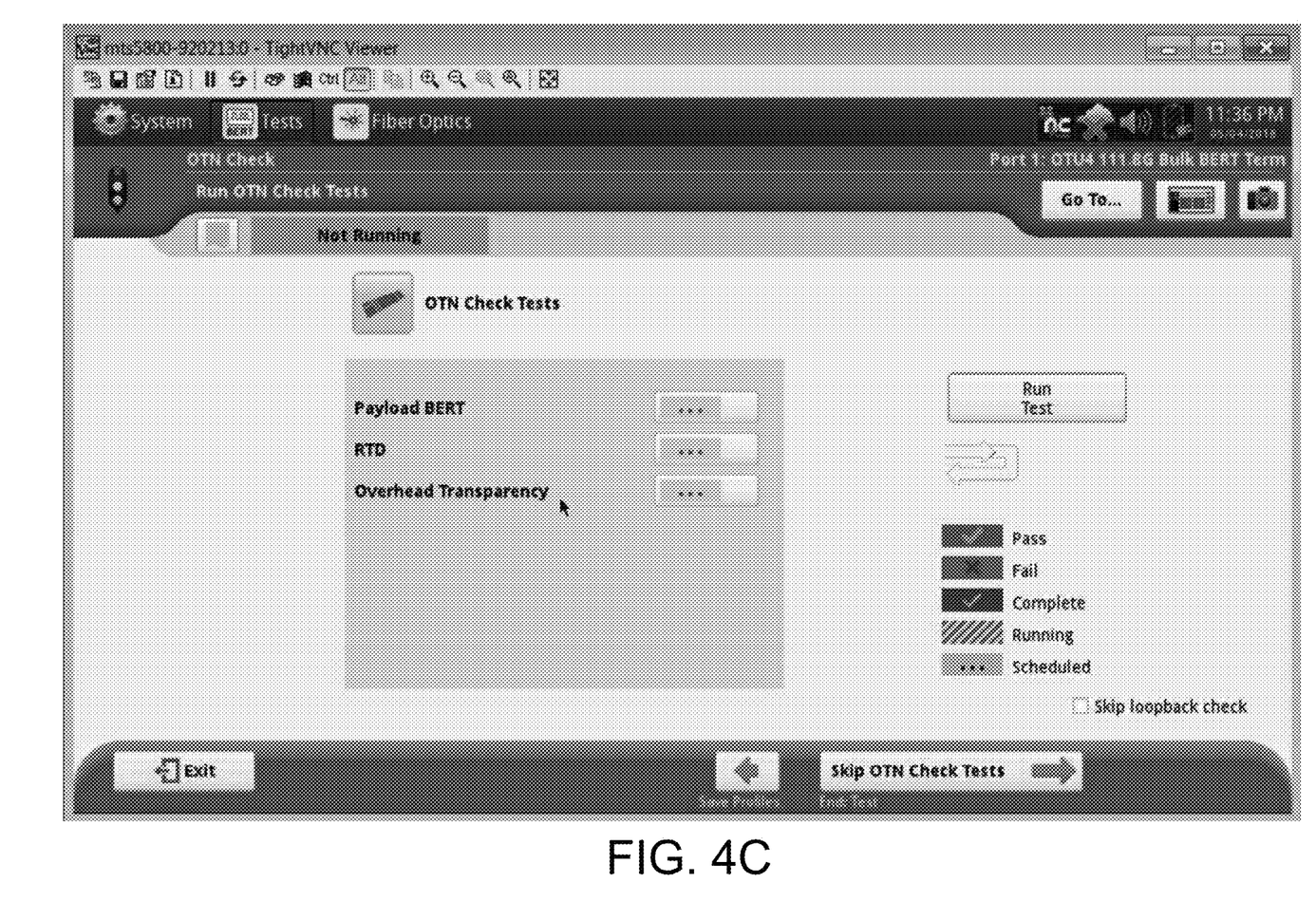
Figure 4D:
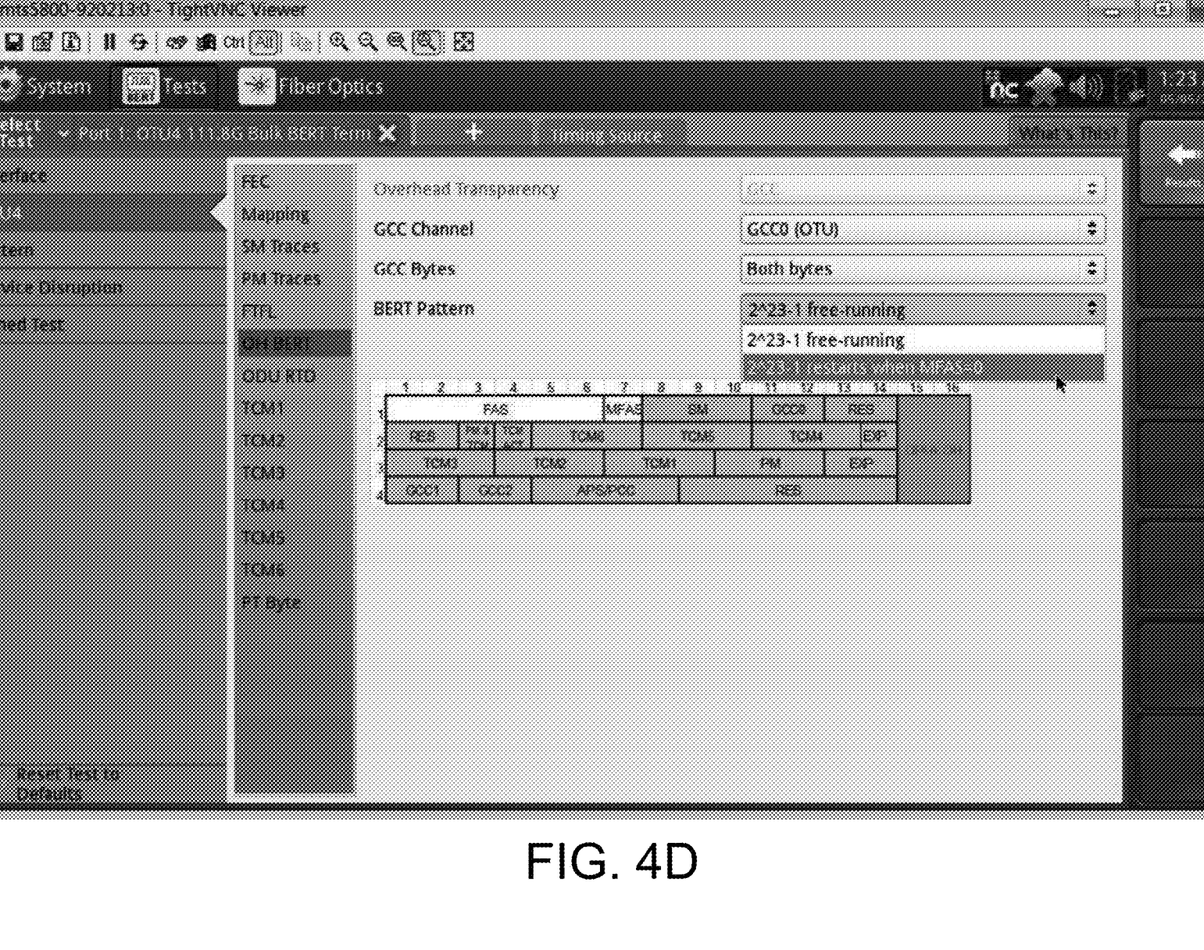

FIGS. 4A-4D illustrate various screens of MFAS-aligned PRBS patterns for Optical Transport Network (OTN) testing, according to another example. As shown, there may be various pull-downs to select overhead transparency, GCC channel, Bit Error Rate Test (BERT) pattern, and other specifics and details for MFAS-aligned PRBS patterns testing of OTN networks. For example, as shown in FIG. 4A, GCC overhead byte location may be selectable for a transparency test. In FIG. 4B, a continuous PRBS or MFAS-aligned PRBS pattern in OTN check tests may be selected. In FIG. 4C, an overhead transparency test may also be configured to be a part of the OTN check tests suite. In FIG. 4D, a continuous PRBS or MFAS-aligned PRBS pattern may be selected in the application setup screen. In one example, a BERT pattern may be set to "$2^{23}$ restarts when MFAS=0" to initiate OTN testing techniques described herein. Other various capabilities and configurations may also be provided.

Figure 5:
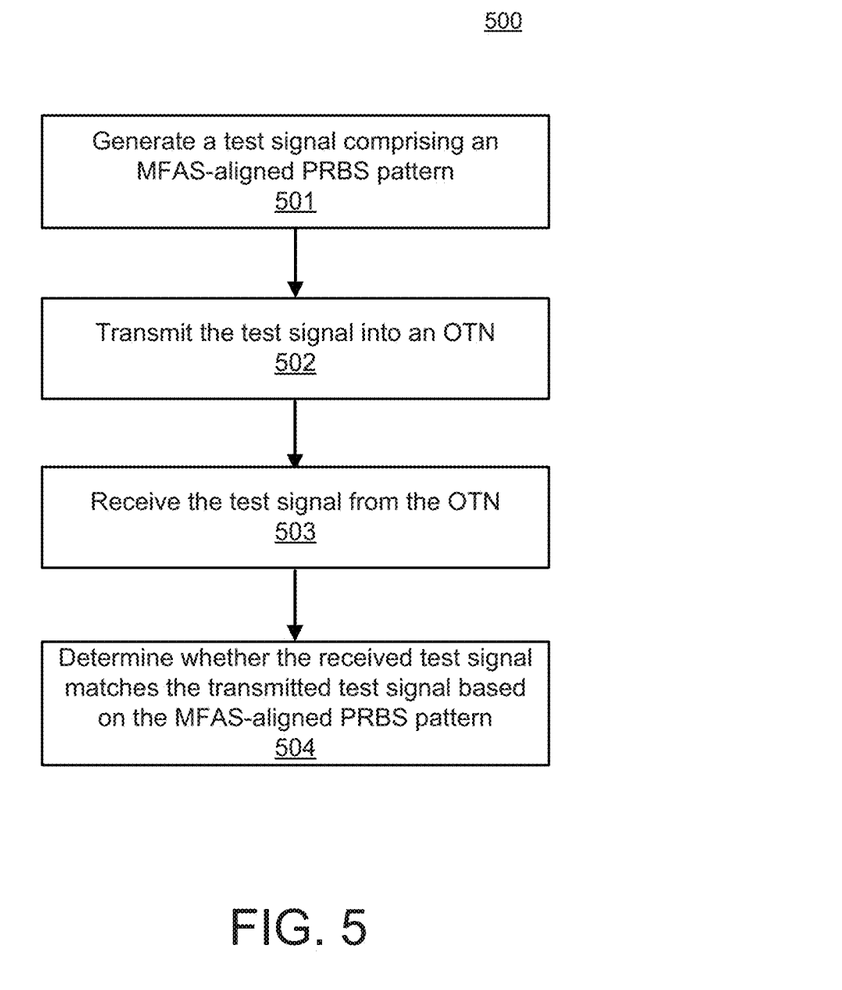
FIG. 5 illustrates a flow chart of a method for Optical Transport Network (OTN) testing using MFAS-aligned PRBS patterns, according to an example.

FIG. 5 illustrates a flow chart of a method for Optical Transport Network (OTN) testing using MFAS-aligned PRBS patterns 500, according to an example. The method 500 is provided by way of example, as there may be a variety of ways to carry out the method described herein. Although the method 500 is primarily described as being performed by test device 100, the method 500 may be executed or otherwise performed by one or more processing components of the test device 100, or by another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At block 501, the test device 100 may generate a test signal. More specifically, a signal generator at the test device 100 may generate a test signal comprising an MFAS-aligned PRBS pattern. The MFAS-aligned PRBS pattern may be generated by identifying MFAS at 0 value, and resetting the PRBS pattern to a seed value, where the seed value may be a non-zero number.

At block 502, a transmitter at the test device 100 may transmit the test signal into an OTN. At block 503, a receive at the test device 100 may receive the test signal from the OTN.

At block 504, a processor at the test device 100 may determine whether the received test signal matches the transmitted test signal based on the MFAS-aligned PRBS pattern. More specifically, determining whether the received test signal matches the transmitted test signal may be achieved by calculating a test value of a potential seed value based the received MFAS-aligned PRBS pattern. Then, the processor may compare the test value to the seed value.

It should also be appreciated that data may be outputted to a user, via an output interface, to inform the user whether the received test signal matches the transmitted test signal based on the MFAS-aligned PRBS pattern. In some examples, the output interface may include a display and the data may include at least one of visual data and audio data.

An MFAS-aligned PRBS patterns for Optical Transport Network (OTN) testing, as described herein, may identify buffering GCC or other OTN performance issues. It may also identify where and how such shifts may have occurred in the OTN. For example, determining a specific frame delay or other change in the PRBS pattern of the return signal may ultimately help remedy OTN functionality and performance. And in situations where data is secured, e.g., using an encryption key, the MFAS-aligned PRBS patterns for OTN testing techniques as described herein may reduce false positives and increase data transmission and security.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device for an optical transport network (OTN) comprising:
    a signal generator to generate a test signal to be carried in plural OTN multiframes, each multiframe including a multiframe alignment signal (MFAS), wherein the test signal comprises an MFAS-aligned pseudorandom binary sequence (PRBS) pattern whose value spans from 0 to 255 to indicate a relative location of each optical channel transport unit-k/optical channel data unit-k (OTUk/ODUk) frame within the multiframe;
    a transmitter to transmit the test signal into an OTN;
    a receiver to receive the test signal from the OTN; and
    a processor to:
        determine whether the received test signal matches the transmitted test signal based on the MFAS-aligned PRBS pattern; and
        identify a problem with the OTN in the event the received test signal does not match the transmitted test signal.

2. The test device of claim 1, wherein the WAS-aligned PRBS pattern is generated by:
    identifying WAS at 0 value; and
    resetting the PRBS pattern to a seed value, where the seed value is a non-zero number.

3. The test device of claim 1, wherein determining whether the received test signal matches the transmitted test signal comprises:
    calculating a test value of a seed value based on the received WAS-aligned PRBS pattern; and
    comparing the test value to the seed value.

4. The test device of claim 1, further comprising an output interface to inform a user whether the received test signal matches the transmitted test signal based on the WAS-aligned PRBS pattern.

5. The test device of claim 4, wherein the output interface comprises a display that provides at least one of visual data and audio to the user.

6. A method of testing an optical transport network (OTN), the method comprising:
    generating, at a signal generator, a test signal to be carried in plural OTN multiframes, each multiframe including a multiframe alignment signal (WAS), wherein the test signal comprises an WAS-aligned pseudorandom binary sequence (PRBS) pattern whose value spans from 0 to 255 to indicate a relative location of each optical channel transport unit-k/optical channel data unit-k (OTUk/ODUk) frame within the multiframe;
    transmitting, by a transmitter, the test signal into an OTN;
    receiving, at a receiver, the test signal from the OTN;
    determining, at a processor, whether the received test signal matches the transmitted test signal based on the WAS-aligned PRBS pattern; and
    identifying a problem with the OTN in the event the received test signal does not match the transmitted test signal.

7. The method of claim 6, wherein the WAS-aligned PRBS pattern is generated by:
    identifying, at the signal generator, MFAS at 0 value; and
    resetting the PRBS pattern to a seed value, where the seed value is a non-zero number.

8. The method of claim 6, wherein determining whether the received test signal matches the transmitted test signal comprises:
    calculating, by the processor, a test value of a seed value based on the received MFAS-aligned PRBS pattern; and
    comparing the test value to the seed value.

9. The method of claim 6, further comprising:
    outputting, at an output interface, data to a user whether the received test signal matches the transmitted test signal based on the MFAS-aligned PRBS pattern.

10. The method of claim 9, wherein the output interface comprises a display and the data comprises at least one of visual data and audio data.

11. A non-transitory computer-readable storage medium having an executable stored thereon, which when executed instructs a processor to perform the following:
    generating a test signal to be carried in plural optical transport network (OTN) multiframes, each multiframe including a multiframe alignment signal (MFAS), wherein the test signal comprises an MFAS-aligned pseudorandom binary sequence (PRBS) pattern whose value spans from 0 to 255 to indicate a relative location of each optical channel transport unit-k/optical channel data unit-k (OTUk/ODUk) frame within the multiframe;
    transmitting the test signal into an Optical Transport Network (OTN);
    receiving the test signal from the OTN;
    determining whether the received test signal matches the transmitted test signal based on the WAS-aligned PRBS pattern; and
    identify a problem with the OTN in the event the received test signal does not match the transmitted test signal.

12. A non-transitory computer-readable storage medium of claim 11, wherein the WAS-aligned PRBS pattern is generated by:
    identifying WAS at 0 value; and
    resetting the PRBS pattern to a seed value, where the seed value is a non-zero number.

13. A non-transitory computer-readable storage medium of claim 11, wherein determining whether the received test signal matches the transmitted test signal comprises:
    calculating a test value of a seed value based on the received WAS-aligned PRBS pattern; and
    comparing the test value to the seed value.

14. A non-transitory computer-readable storage medium of claim 11, further comprising:
    outputting data to a user whether the received test signal matches the transmitted test signal based on the MFAS-aligned PRBS pattern.

15. A non-transitory computer-readable storage medium of claim 14, wherein the data is outputted via at least a display and the data comprises at least one of visual data and audio data.

* * * * *